United States Patent [19]

Bateman

[11] 4,215,334
[45] Jul. 29, 1980

[54] AIRCRAFT EXCESSIVE DESCENT RATE WARNING SYSTEM

[75] Inventor: Charles D. Bateman, Bellevue, Wash.

[73] Assignee: Sundstrand Data Control, Inc., Redmond, Wash.

[21] Appl. No.: 876,305

[22] Filed: Feb. 9, 1978

[51] Int. Cl.² .................. G01C 5/00; G01S 9/04
[52] U.S. Cl. ................. 340/27 AT; 73/178 R; 244/180; 343/7 TA; 364/433
[58] Field of Search .......... 340/27 R, 27 AT, 27 NA; 73/178 R, 178 T; 244/180, 181, 183; 318/583, 584; 364/430, 433, 434, 435; 343/7 TA, 112 A, 112 CA

[56] References Cited

U.S. PATENT DOCUMENTS

| 3,715,718 | 2/1973 | Astengo | 340/27 R |
| 3,947,808 | 3/1976 | Bateman | 340/27 AT |
| 3,958,218 | 5/1976 | Bateman | 340/27 R |
| 3,958,219 | 5/1976 | Bateman et al. | 340/27 R |
| 4,016,565 | 4/1977 | Walker | 343/7 TA |
| 4,060,793 | 11/1977 | Bateman | 340/27 R |
| 4,071,894 | 1/1978 | Schuldt | 340/27 AT |

*Primary Examiner*—John W. Caldwell, Sr.
*Assistant Examiner*—James J. Groody
*Attorney, Agent, or Firm*—Ted E. Killingsworth; Michael B. McMurry

[57] ABSTRACT

In an aircraft excessive rate of descent warning system that utilizes barometric descent rate compared with aircraft altitude above ground to generate a warning, nuisance warnings at airports having terrain that slopes generally downwardly towards the runway can be substantially reduced by modifying either the descent rate signal or the altitude above ground signal as a function of radio altitude rate thereby having the effect of increasing the descent rate required to trigger a warning when the aircraft is descending essentially parallel to the ground.

33 Claims, 5 Drawing Figures

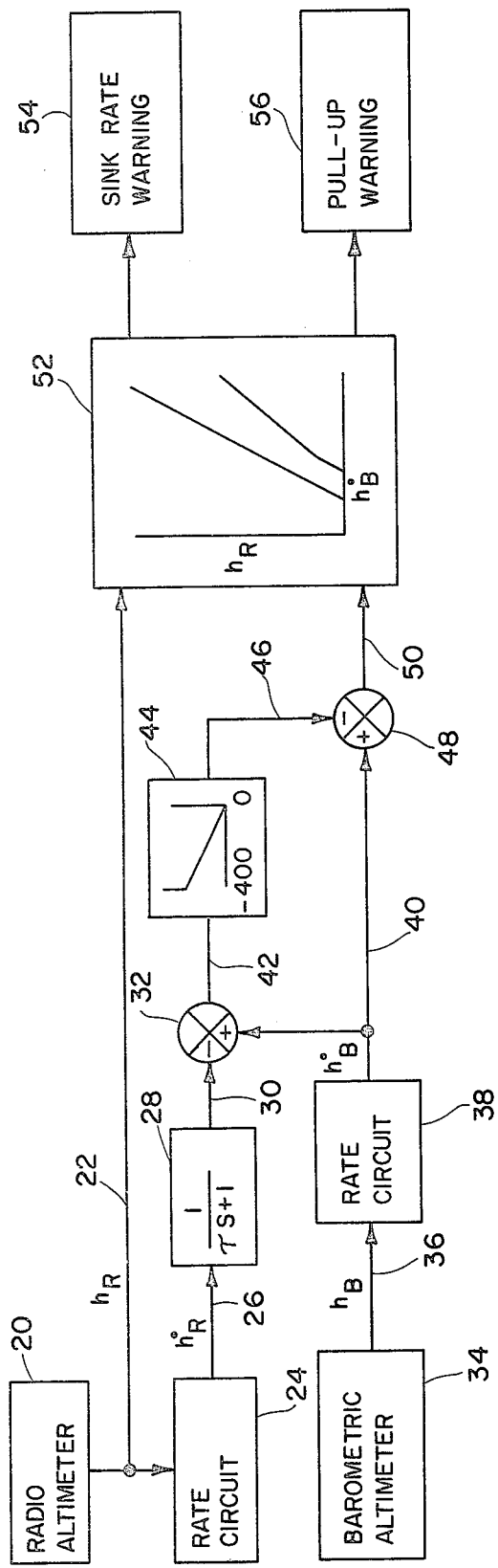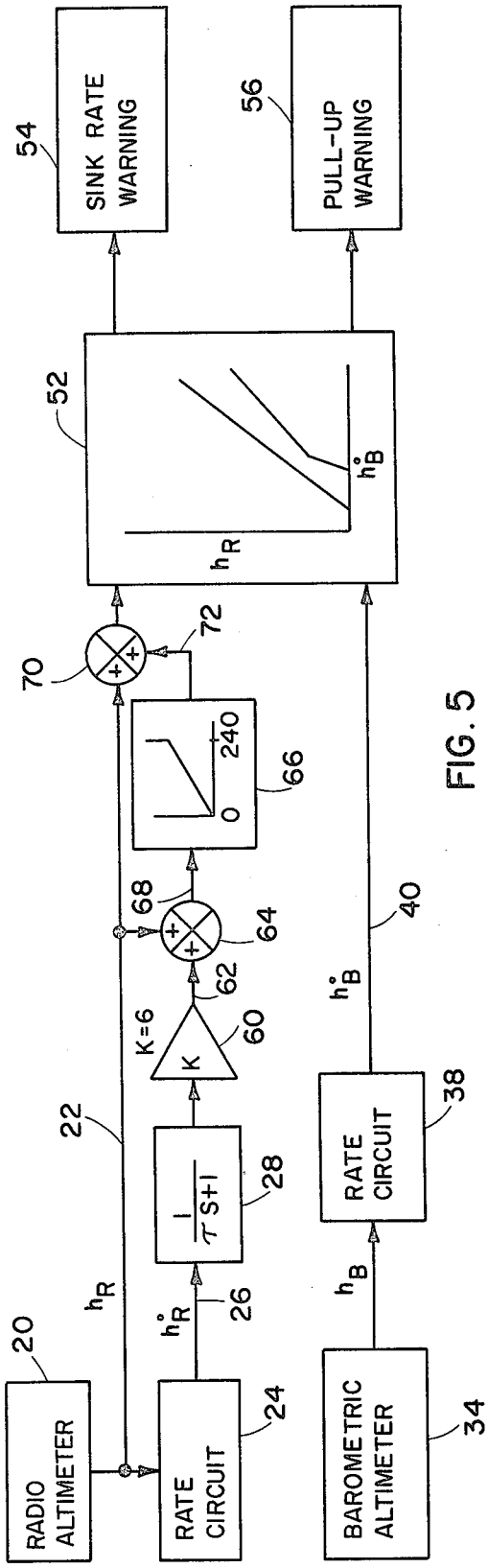
FIG. 4
FIG. 5

AIRCRAFT EXCESSIVE DESCENT RATE WARNING SYSTEM

BACKGROUND OF THE INVENTION

The invention relates to the field of aircraft ground proximity warning systems and more particularly to systems providing warnings of excessive aircraft barometric descent rates.

In prior art systems as represented by Bateman U.S. Pat. No. 3,946,358; Bateman U.S. Pat. No. 3,947,808; and Bateman U.S. Pat. No. 4,060,793 each of which is assigned to the assignee of this application, the relationship between altitude above ground and aircraft descent rate is utilized to generate a warning when the aircraft descent rate is excessive for its altitude above the terrain. In U.S. Pat. No. 3,946,358 for example, an excessive descent rate warning system is disclosed that utilizes a linear relationship between aircraft altitude above terrain and aircraft descent rate wherein the greater the aircraft's altitude above the terrain, the greater the rate of descent that is required to activate the warning. In the excessive descent rate warning system disclosed in U.S. Pat. No. 3,947,808 at descent rates above a predetermined value, a warning is generated for a selected time of impact with the ground assuming the aircraft continues at that particular descent rate. U.S. Pat. No. 4,060,793 discloses a descent rate warning system wherein an advisory voice warning is provided for a first relationship between descent rate and altitude above terrain and a second type of imperative voice warning is generated for greater descent rates at lower altitudes where the danger of aircraft impact with the terrain is more significant.

Studies of the effectiveness of ground proximity warning systems in actual airline operations have indicated that pilot acceptance and confidence is a substantial factor in judging the value of the ground proximity warning systems from the safety standpoint. In judging the effectiveness of a ground proximity warning system one of the primary criteria is the number of nuisance warnings generated by the system. A nuisance warning is generally defined as a warning generated by the system when the aircraft is essentially operating in conformity with offically approved operating procedures such as FAA regulations and the aircraft is not in any immediate danger of impacting the terrain. One source of nuisance warnings in the excessive descent rate warning mode of ground proximity warning systems occasionally occurs during landing approaches where the terrain slopes downwardly towards the runway and it is necessary for the aircraft to maintain a fairly high descent rate in order to make a normal approach. Runway 27 at San Diego, Calif., is one example of such an approach wherein the terrain slopes downwardly towards the end of the runway and the aircraft must perform a relatively steep approach close to the terrain for periods of time that may in some cases extend as long as 30 seconds. These approaches will occasionally cause the aircraft to penetrate the warning envelopes disclosed in the above mentioned references and in particularly the sink rate warning envelope of U.S. Pat. No. 4,060,793. Warnings under these circumstances can be considered nuisance warnings since the aircraft is operating within officially approved flight procedures and is in no danger of impacting the terrain.

However, merely decreasing the sensitivity of the warning system by increasing the descent rate required to generate a warning or decreasing the altitude at which a warning is generated would tend to eliminate warnings under circumstances where historical analysis has shown that accidents have actually occurred thus decreasing the effectiveness of the system in warning of hazardous flight profiles. Therefore, in order to enhance pilot acceptance of the systems, it is considered desirable to eliminate this type of nuisance warning generated in areas where the aircraft is traversing terrain that is sloping downwardly toward the runways while at the same time not decreasing the effectiveness of the system in warning of dangerous flight conditions.

SUMMARY OF THE INVENTION

It is therefore an object of the invention to provide an excessive descent rate warning system wherein a terrain altitude rate signal representing the aircraft's rate of change of altitude with respect to the ground is utilized to vary the predetermined relationship between descent rate and altitude above ground required to initiate a pilot warning.

It is an additional object of the invention to provide an excessive descent rate warning system utilizing barometric descent rate signals and radio altitude signals wherein a radio altitude rate signal is utilized to modify the barometric rate signal to effectively increase the descent rate required to generate an excessive descent rate warning as a function of decreasing radio altitude rate signals.

It is a further object of the invention to provide an excessive descent rate warning system utilizing a barometric descent rate signal and a radio altimeter signal wherein the radio altitude signal is modified as a function of a radio altitude rate signal thereby effectively increasing the descent rate required to generate an excessive descent rate warning as a function of decreasing altitude rate.

Prior art excessive descent rate warning systems typically compare the aircraft's barometric descent or sink rate with the aircraft's altitude above the terrain, typically measured by a radio altimeter, and generate descent rate warnings as a function of a predetermined relationship between barometric descent rate and aircraft altitude above the terrain. To overcome the nuisance warnings discussed above, either the radio altitude signal or the barometric descent rate signal is modified as a function of a radio altitude rate signal in order to effectively increase the descent rate at which a descent rate warning is generated.

In one embodiment the descent rate signal is reduced by an amount that is inversely proportional to the radio altitude rate signal so that when the radio altitude rate signal is zero, indicating that the aircraft is essentially flying parallel to the terrain, the descent rate signal is reduced by an amount such as 400 feet per minute. When the magnitude of the radio altitude rate signal increases, indicating that the aircraft is approaching the ground, the amount that the descent rate signal is reduced is decreased as a function of the increasing radio altitude rate. In a second embodiment, the radio altitude signal is increased as a function of decreasing radio altitude rate. This also has the effect of increasing the descent rate at which a warning is generated. When the radio altitude rate is zero indicating that the aircraft is flying essentially parallel to the terrain, the radio altimeter signal is increased by an amount such as 240 feet. As the radio altitude rate signal increases, the amount that the radio altitude signal is increased is decreased as a function of increasing radio altitude rate until the effect of radio altitude rate is eliminated altogether from the radio altitude signal.

As a result, either of the two embodiments described above will effectively decrease the sensitivity of the excessive descent rate warning mode of a ground proximity warning system when the aircraft is essentially flying parallel to the terrain on a landing approach thereby tending to substantially reduce nuisance warnings at certain airports.

BRIEF DESCRIPTION OF THE DRAWINGS

FIG. 4 is a functional block diagram of the logic circuit of one embodiment of the invention; and FIG. 5 is a functional block diagram of a second embodiment of the invention.

DETAILED DESCRIPTION OF THE INVENTION

Figure 1:
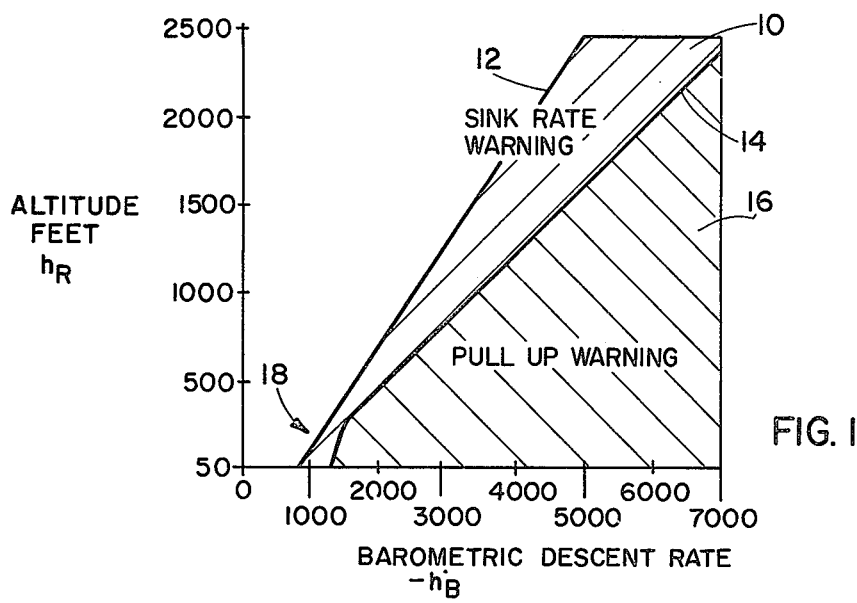
FIG. 1 is a graphic illustration of the warning envelopes or relationships between aircraft barometric descent rate and altitude above the terrain that will cause a descent rate warning to be generated.

A graphic illustration of both a sink rate warning envelope and a pull up warning envelope for an excessive descent rate warning system is provided in FIG. 1. These are the same warning envelopes that are generated by the sink rate warning system for aircraft of the aforementioned U.S. Pat. No. 4,060,793. Other warning envelopes are generated by the systems disclosed in U.S. Pat. Nos. 3,946,358 and 3,947,808. The crosshatched area 10 located between lines 12 and 14 of FIG. 1 define the combinations of radio altitude and descent rate that will trigger a "sink rate" warning. The crosshatched area 16 beneath line 14 indicates those combinations of radio altitude and descent rate that will trigger a "pull up" warning. An example of a circuit for generating the warning envelopes illustrated in FIG. 1 is provided in U.S. Pat. No. 4,060,793.

As discussed above, under certain landing approach conditions where the aircraft is approaching a runway where the terrain slopes downwardly towards the runway and is substantially parallel to the approach path, aircraft have occasionally penetrated the lower portion of the warning envelopes indicated generally by point 18 on FIG. 1. As a specific example, on approaches to runway 27 of the San Diego, Calif., airport which has terrain that generally parallels the designated glideslope or approach path, aircraft have occasionally received sink rate warnings at descent rates of 1100 feet per minute at altitudes of 120 feet. These altitudes and descent rates are considered to be within authorized and safe operating criteria so that the warnings can be considered nuisance warnings.

Figure 2:
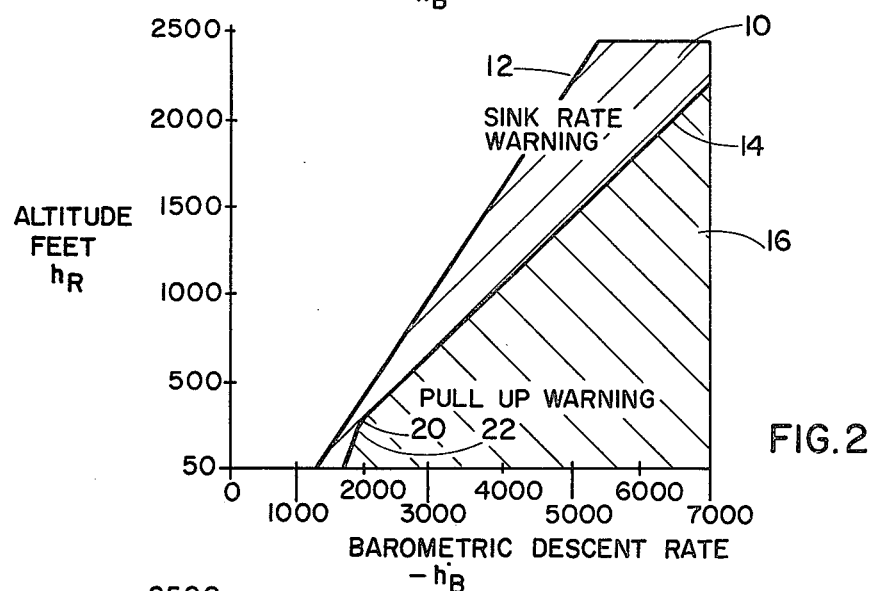
FIG. 2 is an illustration of warning envelopes similar to FIG. 1 except that the vertical axis has in effect been shifted to the left by increasing the descent rate required to generate a warning.

In order to eliminate this type of nuisance warnings without degrading overall warning system effectiveness, modifications to the excessive descent rate warning system such as shown by the block diagram in FIG. 4 have been developed. As illustrated by the warning envelopes of FIG. 2 the warning envelopes can be moved to the right as compared to the warning envelopes of FIG. 1 thus effectively increasing the descent rate required to generate a warning for any given altitude above the ground when the aircraft is generally travelling parallel to the terrain. The preferred embodiment of the invention is illustrated by the block diagram in FIG. 4 which can under certain circumstances generate the warning envelopes as shown in FIG. 2. A radio altimeter 20 provides a signal $h_R$ on line 22 which represents the aircraft's altitude above ground. The radio altitude signal $h_R$ on line 22 is used as an input to a rate circuit 24 that generates a radio altitude rate signal $\dot{h}_R$ on line 26 which represents the aircraft's rate of altitude change with respect to the terrain. Radio rate signal $\dot{h}_R$ on line 26 is then applied to a filter circuit 28 which serves to lag the $\dot{h}_R$ signal preferably by a time factor of three seconds. The lagged $\dot{h}_R$ signal on line 30 is utilized as an input to a negative summing terminal of a summing junction 32.

A barometric altimeter 34 provides a source of signals $h_B$ on line 36 which represents the aircraft's barometric altitude. In turn, a rate circuit 38 is used to generate a barometric altitude rate signal $\dot{h}_B$ on line 40. The $\dot{h}_B$ signal, the negative value of which is considered to be the barometric descent rate signal, is applied to a positive terminal of the summing junction 32.

The output of the summing junction 32 on line 42 which can be termed a descent rate modification signal is applied to a limit circuit 44. The function of the limit circuit 44 is to limit the descent rate modification signal to values of between zero and minus 400 feet per minute. The limited descent rate modification signal is then applied over line 46 to a negative terminal of a second summing junction 48. In addition to the limited descent rate modification signal on line 46, summing junction 48 also receives at a positive terminal the descent rate signal $\dot{h}_B$ on line 40.

Receiving the radio altitude signal $h_R$ on line 22 and the output of summing junction 48 on line 50 is a comparator circuit 52. The function of the comparator circuit 52 is to generate the warning envelopes shown in FIG. 1 based on a comparison of the radio altitude $h_R$ and the aircraft's descent rate $\dot{h}_B$. The comparator circuit 52 can be implemented by using any of the circuits in the aforementioned U.S. Pat. Nos. 3,946,358; 3,947,808; and 4,060,793. In particular, the circuit illustrated in U.S. Pat. No. 4,060,793 can provide the warning envelopes illustrated in FIG. 1. As discussed in this patent, the comparator circuit 52 can provide a signal to a sink rate warning device 54 or to a pull up warning device 56 depending upon the aircraft's rate of descent as compared to the aircraft's altitude above ground.

As indicated above, the system illustrated in block diagram form in FIG. 4 will serve to shift the warning envelopes shown in FIG. 1 to the right when the radio altitude rate signal $\dot{h}_R$ indicates that the aircraft is closing with the terrain, below a predetermined rate. When the radio altitude rate signal $\dot{h}_R$ is zero, thereby indicating that the aircraft is flying parallel to the terrain, the $\dot{h}_B$ signal will be transmitted through summing junction 32, limited to a maximum value in limiter 44 of 400 feet per minute and subtracted from the $\dot{h}_B$ signal on line 40 by summing junction 48. This will shift the warning envelopes of FIG. 1 400 feet per minute to the right as illustrated in FIG. 2 thereby having the effect of increasing the descent rate required to trigger a descent rate warning. As the radio altitude rate signal increases in negative value indicating that the aircraft is closing with the terrain, summing junction 32 will serve to reduce the descent rate modification signal on line 42 as a function of the radio altitude rate signal on line 30. When the radio altitude rate signal $\dot{h}_R$ is equal to the descent rate signal $\dot{h}_B$, indicating that the barometric descent rate is equal to the terrain closure rate the descent rate modification signal will be zero thereby providing the warning envelope as shown in FIG. 1.

Figure 3:
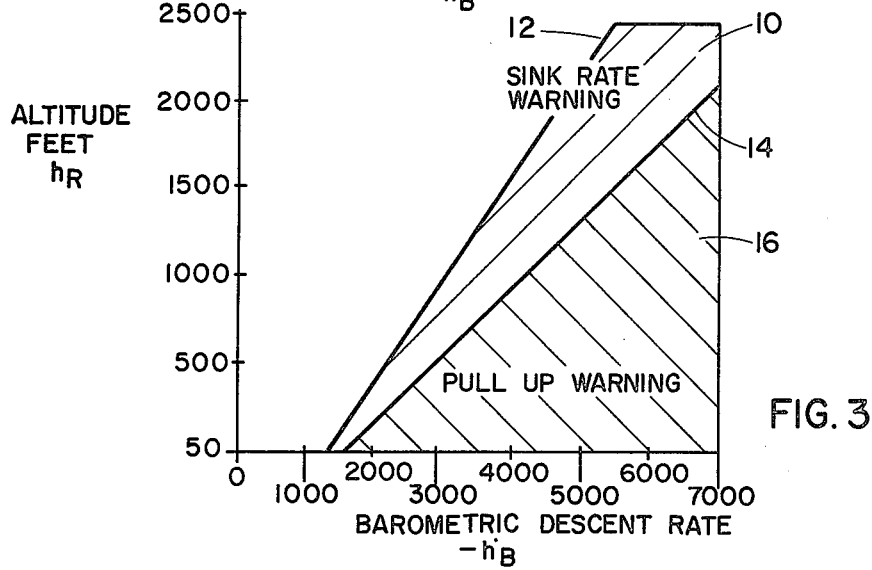
FIG. 3 is an illustration of warning envelopes similar to the warning envelopes of FIG. 1 except that the horizontal axis has in effect been shifted upwardly by decreasing the altitude above ground signal required to generate a warning.

A second embodiment of the invention is disclosed in the block diagram of FIG. 5 and illustrated by the warning envelopes of FIG. 3. In this case the radio altitude signal $h_R$ on line 22 is modified as a function of radio altitude rate signal $\dot{h}_R$ instead of modifying the descent rate signal $\dot{h}_B$ as discussed above in connection with the system shown in FIG. 4. In the system of FIG. 5, the $\dot{h}_R$ signal is applied to a scaling amplifier 60 which serves to generate a scaled altitude rate signal on line 62 which is compatible in units to the radio altitude signal $h_R$ on line 22. In this embodiment a suitable value for the scaling factor K is 0.6 which will serve to convert each foot per minute of radio altitude rate into 0.6 feet of radio altitude. The output of scaling amplifier 60 on line 62 is then applied to a positive terminal of the summing junction 64 and the radio altitude signal $h_R$ on line 22 is applied to another positive input terminal of summing junction 64. A limiter circuit 66 receives the output of summing junction 64 over line 68 and effectively limits the maximum value of what can be termed a radio altitude modification signal on line 68 to a maximum value of preferably 240 feet. Thus the limiter 66 serves to limit the altitude modification signals between zero and a maximum value of 240 feet. A second summing junction 70 receives the output of limiter 66 over line 72 and effectively adds the limited radio altitude modification signal to the radio altitude signal $h_R$. The output of summing junction 70 is then applied to the comparator circuit 52 to generate, in combination with the descent rate signal on line 40, the descent rate warnings as discussed above.

The system disclosed in FIG. 5 has the general effect of shifting the warning envelopes illustrated in FIG. 1 to the right as a function of the radio altitude rate signal. More specifically, however, the system in FIG. 5 moves the horizontal axis of FIG. 1 upwardly to produce, when the radio altitude rate signal is zero, the warning envelopes shown in FIG. 3. When the radio altitude rate signal is zero or a positive value, a maximum value of 240 feet of radio altitude is added by means of summing junctions 64 and 70 to the radio altitude signal on line 22 and then applied over line 74 to the comparator 52. As the radio altitude rate signal $\dot{h}_R$ increases in negative value indicating that the aircraft is closing with the terrain summing junction 64 will serve to reduce the altitude modification signal on line 68 proportionately until the scaled signal on line 62 is equal to the radio altitude signal on line 22. The limiter 66 will also serve to limit the altitude modification signals on line 72 to essentially positive values in order to prevent the altitude signal from being decreased when a negative signal on line 62 exceeds the altitude signal on line 22. As a result it may be seen that the system illustrated in FIG. 5 will have the effect of increasing the descent rate required to generate a warning when the radio altitude rate indicates that the aircraft is not approaching the terrain.

Although the invention was illustrated in terms of analog logic of computer circuits as shown in FIGS. 4 and 5, it will be apparent that these functions can be performed by a digital computer having the same inputs and interfacing with the warning devices 54 and 56. For example, the functions of elements 28–32 and 40–52 of both FIGS. 4 and 5 could be performed by a digital computer wherein digital signals functionally related to descent rate $\dot{h}_B$, radio altitude $h_R$ and radio altitude rate $\dot{h}_R$ are used as input to a digital computer.

I claim:

1. In a system for warning of an excessive rate of aircraft descent, having means for generating a signal representing the rate of descent of the aircraft, means for generating a signal representing altitude of the aircraft above ground, means for comparing long-term components of the descent rate signal with the altitude signal and for detecting a predetermined relationship between said signals to initiate an excessive descent rate warning, an improvement comprising:

means for generating a terrain altitude rate signal representing the aircraft's rate of change of altitude with respect to the ground; and means, responsive to said terrain altitude rate signal, for varying the predetermined relationship between the long-term components of the descent rate and the altitude signals required to initiate the warning as a function of said terrain altitude rate signal.

2. The system of claim 1 wherein said varying means includes means for effectively increasing the descent rate at which a warning is initiated as a function of a decrease in said altitude rate signals which indicate a decrease in the rate of approach of the aircraft to the terrain.

3. The system of claim 1 wherein said varying means includes descent rate signal modifying means for reducing the value of the descent rate signal as a function of said decreasing altitude rate signals.

4. The system of claim 3 wherein said descent rate signal modifying means includes a limit means for limiting to a maximum value the amount that the descent rate signal can be reduced.

5. The system of claim 4 wherein said limit on the maximum value of the descent rate signal is approximately 400 feet per minute.

6. The system of claim 4 wherein said limit means additionally limits the operation of said modifying means to prevent the descent rate signal from being increased.

7. The system of claim 3 wherein said modifying means includes summing means for subtracting said altitude rate signal from the descent rate signal to produce a descent rate modification signal and subtracting said modification signal from descent rate signal.

8. The system of claim 7 wherein said summing means includes means for limiting said descent rate modification signal to a predetermined maximum value.

9. The system of claim 8 wherein said predetermined maximum value is approximately 400 feet per minute.

10. The system of claim 7 wherein said summing means additionally includes means to limit said modification signals to essentially positive values in order to prevent the descent rate signal from being increased.

11. The system of claim 7 wherein said summing means includes a first summing junction effective to subtract said altitude rate signal from the descent rate signal to produce a descent rate modification signal and a second summing junction effective to subtract said modification signal from said descent rate signal.

12. The system of claim 11 wherein said summing means includes a limiter operatively interposed between said first and said second summing junctions effective to limit said modification signal to a predetermined range of values.

13. The system of claim 12 wherein said predetermined range of value is approximately zero to 400 feet per minute.

14. The system of claim 2 wherein said varying means includes altitude signal modifying means for increasing the value of the altitude signal, representing altitude of the aircraft above ground, as a function of said decreasing altitude rate signals.

15. The system of claim 14 wherein said altitude signal modifying means includes a limit means for limiting to a maximum value the amount that the altitude signal can be increased.

16. The system of claim 15 wherein said maximum value is approximately 240 feet.

17. The system of claim 15 wherein said limit means additionally limits the operation of said modifying means to prevent the altitude signal from being decreased.

18. The system of claim 14 wherein said modifying means includes scaling means, responsive to said altitude rate signal, for generating a scaled altitude signal as a function of said altitude rate signal and summing means for summing said scaled altitude signal with the altitude signal to produce an altitude modification signal and summing said altitude modification signal with the altitude signal.

19. The system of claim 18 wherein said summing means includes means for limiting said altitude modification signal to a predetermined maximum value.

20. The system of claim 19 wherein said predetermined maximum value is approximately 240 feet.

21. The system of claim 18 wherein said summing means includes means to limit said altitude modification signals to essentially positive values in order to prevent the altitude signal from being decreased.

22. The system of claim 14 wherein said scaling means function is approximately 0.6 feet for each foot per second of said altitude rate signal.

23. The system of claim 18 wherein said summing means includes a first summing junction effective to sum said scaled altitude rate signal with the altitude signal to generate said altitude modification signal and a second summing junction effective to sum said altitude modification signal with the altitude signal.

24. The system of claim 23 wherein said summing means includes a limiter operatively connected between said first and second summing junctions effective to limit said altitude modification signal to a predetermined range of values.

25. The system of claim 24 wherein said predetermined range of values is approximately zero to 240 feet.

26. A system for warning of an excessive rate of aircraft descent comprising:
means including a barometric altimeter for generating a barometric altitude signal;
means responsive to said barometric altitude signal for generating a barometric descent rate signal;
means including a radio altimeter for generating a radio altitude signal;
means, responsive to said radio altitude signal, for generating a radio altitude rate signal;
computer means responsive to said descent rate signal, said radio altitude signal and said radio altitude rate signal, for generating an excessive descent rate warning initiate signal wherein a first value functionally related to said descent rate signal is compared to a second value functionally related to said radio altitude signal to generate said warning initiate signal whenever the long-term component of said first value exceeds said second value and wherein said first value is varied as a function of said ratio altitude rate signal to effectively increase the descent rate at which a warning initiate signal is generated as a function of decreasing radio altitude rate signals indicating aircraft approach to the terrain; and
means responsive to said warning initiate signal, for generating a pilot warning.

27. The system of claim 26 wherein said first value is decreased by an amount representing a maximum of 400 feet per second descent rate when said radio rate signal is zero.

28. A system for warning of an excessive rate of aircraft descent comprising:
means including a barometric altimeter for generating a barometric altitude signal;
means responsive to said barometric altitude signal for generating a barometric descent rate signal;
means including a radio altimeter for generating a radio altitude signal;
means, responsive to said radio altitude signal, for generating a radio altitude rate signal;
computer means responsive to said descent rate signal, said radio altitude signal and said radio altitude rate signal, for generating an excessive descent rate warning initiate signal wherein a first value functionally related to said descent rate signal is compared to a second value functionally related to said radio altitude signal to generate said warning initiate signal whenever the long-term components of said first value exceeds said second value and wherein said second value is varied as a function of said radio altitude rate signal to effectively decrease the altitude above terrain at which a warning initiate signal is generated as a function of decreasing radio altitude rate signals indicating aircraft approach to the terrain; and
means responsive to said warning initiate signal, for generating a pilot warning.

29. The system of claim 28 wherein said second value is increased by a maximum of 240 feet when said radio rate signal is zero.

30. An aircraft excessive descent rate warning system utilizing a signal from a barometric altimeter representing aircraft barometric altitude and a signal from a radio altimeter representing aircraft altitude above the terrain, comprising:
a first rate circuit responsive to the barometric altitude signal for generating a barometric descent rate signal;
a second rate circuit responsive to the radio altitude signal for generating a radio altitude rate signal;
a first summing junction operatively responsive to said first and second rate circuits for combining said descent rate signal and said radio altitude rate signal;
a limit circuit operatively connected to the output of said first summing junction;

a second summing junction operatively connected to said first rate circuit and said limiter circuit for combining said descent rate signal with the output of said limit circuit;

a comparator circuit responsive to the radio altitude signal and responsive to said second summing junction for generating an excessive descent rate initiate signal; and a pilot warning device operatively connected to said comparator circuit and responsive to said initiate signal.

31. The system of claim 30 additionally including a lag circuit operatively connected between said second rate circuit and said first summing junction.

32. An aircraft excessive descent rate warning system utilizing a signal from a barometric altimeter representing aircraft barometric altitude and a signal from a radio altimeter representing aircraft altitude above the terrain, comprising:

a first rate circuit responsive to the barometric altitude signal for generating a barometric descent rate signal;

a second rate circuit responsive to the radio altitude signal for generating a radio altitude rate signal;

a scaling circuit operatively connected to the output of said second rate circuit for converting said radio altitude rate signal into a scaled altitude signal;

a first summing junction operatively connected to the radio altimeter and said scaling circuit effective to sum the radio altitude signal with said scaled altitude signal;

a limit circuit operatively connected to the output of said first summing junction;

a second summing junction operatively connected to the radio altimeter and said limiter circuit for combining the radio altitude signal with the output of said limit circuit;

a comparator circuit operatively connected to said first rate circuit and said second summing junction for generating an excessive descent rate initiate signal; and a pilot warning device operatively connected to said comparator circuit and responsive to said initiate signal.

33. The system of claim 32 additionally including a lag circuit operatively connected between said second rate circuit and said scaling circuit.

* * * * *